(12) United States Patent
Shin et al.

(10) Patent No.: US 10,551,958 B2
(45) Date of Patent: Feb. 4, 2020

(54) TOUCH INPUT DEVICE AND VEHICLE INCLUDING THE TOUCH INPUT DEVICE

(71) Applicant: HYUNDAI MOTOR COMPANY, Seoul (KR)

(72) Inventors: Dongsoo Shin, Suwon-si (KR); Jeong-Eom Lee, Yongin-si (KR); Sihyun Joo, Seoul (KR)

(73) Assignee: Hyundai Motor Company, Seoul (KR)

( * ) Notice: Subject to any disclaimer, the term of this patent is extended or adjusted under 35 U.S.C. 154(b) by 55 days.

(21) Appl. No.: 15/280,173

(22) Filed: Sep. 29, 2016

(65) Prior Publication Data

US 2017/0269768 A1 Sep. 21, 2017

(30) Foreign Application Priority Data

Mar. 15, 2016 (KR) .......................... 10-2016-0030689

(51) Int. Cl.
| | |
|---|---|
| *G06F 3/041* | (2006.01) |
| *G06F 3/0354* | (2013.01) |
| *G06F 3/044* | (2006.01) |
| *G06F 3/0488* | (2013.01) |
| *B60K 35/00* | (2006.01) |

(52) U.S. Cl.
CPC ............ *G06F 3/0416* (2013.01); *B60K 35/00* (2013.01); *G06F 3/03547* (2013.01); *G06F 3/044* (2013.01); *G06F 3/04883* (2013.01); *B60K 2370/1446* (2019.05); *B60K 2370/774* (2019.05); *G06F 3/0412* (2013.01); *G06F 2203/04101* (2013.01); *G06F 2203/04102* (2013.01)

(58) Field of Classification Search
None
See application file for complete search history.

(56) References Cited

U.S. PATENT DOCUMENTS

| | | | |
|---|---|---|---|
| 9,665,279 B2* | 5/2017 | Griffin | ................ G06F 3/04897 |
| 2012/0235949 A1* | 9/2012 | Ligtenberg | ............ G06F 1/1616 |
| | | | 345/174 |
| 2013/0100079 A1* | 4/2013 | Chang | ................... G06F 3/0412 |
| | | | 345/175 |
| 2013/0166046 A1* | 6/2013 | Kubota | .................. G05B 19/02 |
| | | | 700/83 |

(Continued)

FOREIGN PATENT DOCUMENTS

| | | |
|---|---|---|
| JP | 2013-191015 A | 9/2013 |
| JP | 2014-113948 A | 6/2014 |

(Continued)

*Primary Examiner* — Amr A Awad
*Assistant Examiner* — Andre L Matthews
(74) *Attorney, Agent, or Firm* — Morgan, Lewis & Bockius LLP

(57) ABSTRACT

A touch input device includes a mounting unit in which a mounting groove is formed at an inner side of the mounting unit, and a touch unit accommodated in the mounting groove and installed to be detachable from the mounting unit, wherein the touch unit comprises a first touch portion and a second touch portion, which are provided on different surfaces of the touch unit and allow a user to input a touch gesture, and the touch unit is selectively coupled to the mounting unit to allow the first touch portion to face an upper side or to allow the second touch portion to face the upper side.

10 Claims, 18 Drawing Sheets

(56) References Cited

U.S. PATENT DOCUMENTS

| | | |
|---|---|---|
| 2014/0307182 A1 | 10/2014 | Kawano et al. |
| 2016/0054843 A1* | 2/2016 | Watanabe ............. G06F 3/0488 345/173 |
| 2017/0108960 A1* | 4/2017 | Lee ......................... G06F 3/041 |
| 2017/0139442 A1* | 5/2017 | Yoshizumi ............... G04G 9/04 |

FOREIGN PATENT DOCUMENTS

| | | |
|---|---|---|
| JP | 2014-206820 A | 10/2014 |
| JP | 2015-092422 A | 5/2015 |
| KR | 20-2001-0000722 U | 1/2001 |
| KR | 20-2010-0003321 U | 3/2010 |
| KR | 10-2010-0120143 A | 11/2010 |
| KR | 10-2015-0108259 A | 9/2015 |

* cited by examiner

US 10,551,958 B2

TOUCH INPUT DEVICE AND VEHICLE INCLUDING THE TOUCH INPUT DEVICE

CROSS-REFERENCE TO RELATED APPLICATION(S)

This application claims the benefit of Korean Patent Application No. 10-2016-0030689, filed on Mar. 15, 2016 with the Korean Intellectual Property Office, the disclosure of which is incorporated herein by reference.

TECHNICAL FIELD

Embodiments of the present disclosure relate to a touch input device and a vehicle including the touch input device, particularly a touch input device configured to input a gesture and a vehicle including the touch input device.

BACKGROUND

In general, various electronic devices have been produced through the development of electronic communication technology, and design together with convenience of operation is often emphasized in such electronic devices. In accordance with this development, it may be emphasized that the input device, which is represented by a keyboard or a key pad, is diversified across many technologies.

The input device may be used in a variety of display systems configured to provide information to a user e.g. a mobile terminal, a lap-top, a smart phone, a smart pad, and a smart TV, etc. In accordance with the development of the electronic device, a method to input a command signal by using a touch may be used rather than an input method by using an operation key, and a dial, etc.

A touch input device may be a kind of an input device configured to compose an interface between communication equipment by using a variety of display devices, and a user, and may allow the interface between communication equipment and the user to be performed when a user directly touches or approaches a touch pad or a touch screen by using an input tool such as a finger or a touch pen.

Since the touch input device is easily used by all ages through a simple contact to an input tool, such as a finger or a touch pen, the touch input device may be used in various devices, such as an Automated Teller Machine (ATM), Personal Digital Assistant (PDA), and mobile phone, and in various field, such as banks, government offices, tourism and traffic guidance.

In recent years, there has been an effort to apply the touch input device to health-medical related products and a vehicle. The utilization of the touch panel has increased since the touch panel is used together with the touch screen or the touch panel is independently used in the display system. In addition, a function of inputting a gesture by using a touch has been developed beyond a function of moving a point by using a touch.

As for a touch input device configured to input a gesture, the effort has been continued to improve the recognition rate of the gesture as well as improving a user's convenience.

SUMMARY

Therefore, it is an aspect of the present disclosure to provide a touch input device capable of improving a sense of operation and a sense of touch when a user inputs a gesture, and a vehicle having the same.

It is another aspect of the present disclosure to provide a touch input device for allowing a user to precisely and intuitively input a gesture without keeping their eyes on a touch input unit and a vehicle having the same.

It is another aspect of the present disclosure to provide a touch input device for allowing a touch surface shape to be changeable according to a user's preference, and a vehicle having the same.

Additional aspects of the present disclosure will be set forth in part in the description which follows and, in part, will be obvious from the description, or may be learned by practice of the present disclosure.

In accordance with one aspect of the present disclosure, a touch input device comprises a mounting unit in which a mounting groove is formed at an inner side of the touch input device or mounting unit; and a touch unit accommodated in the mounting groove and installed to be detachable from the mounting unit, wherein the touch unit comprises a first touch portion and a second touch portion, which are provided on different surfaces of the touch unit and allow a user to input a touch gesture, and the touch unit is selectively coupled to the mounting unit to allow the first touch portion to face an upper side or to allow the second touch portion to face the upper side.

Also, a first screw unit provided in an outer surface of the touch unit and a second screw unit provided in an inner surface of the mounting groove are screw-coupled to each other.

Also, the first screw unit or the second screw unit is provided with a locking unit so that the coupling of the first screw unit and the second screw unit is completed in the same position as when the touch unit is coupled to the mounting unit.

Also, a first signal unit provided in an outer surface of the touch unit and a second signal unit provided in an inner surface of the mounting groove are connected to each other to transmit a signal.

Also, the touch input device further comprises a touch sensor unit provided in the first touch portion and the second touch portion; a touch coordinate calculator for calculating a point to which a touch signal is input from the touch sensor unit; and a coordinate converter for converting a touch coordinate when a touch signal is input to the second touch portion.

Also, the touch sensor unit is connected to a plurality of the first signal units provided in an outer surface of the touch unit, the plurality of the first signal units is connected to a plurality of the second signal units provided in an inner surface of the mounting groove, respectively, to transmit a touch signal to the touch coordinate calculator, and the coordinate converter inversely converts an arrangement of a touch signal that is input via the plurality of the second signal units when a touch signal is input to the second touch unit.

Also, the first screw unit of the touch unit is formed along an outer surface of the touch unit in a range of less than 360 degrees, and a first signal unit for transmitting a touch signal of the first touch portion or the second touch portion is provided in an area in which the first screw unit is not formed, and the second screw unit of the mounting unit is formed along an inner surface of the mounting groove in a range of less than 360 degrees, and a second signal unit connected to the first signal unit is provided in an area in which the second screw unit is not formed.

Also, the touch unit further comprises a detection pattern provided between the first touch portion and the second touch portion, wherein the detection pattern detects both of a touch signal input to the first touch portion and a touch signal input to the second touch portion.

Also, a distance from the first touch portion to the detection pattern is the same as a distance from the second touch portion to the detection pattern.

Also, the first touch portion comprises a concave curved shape and the second touch portion comprises a convex curved shape corresponding to the concave curved shape of the first touch portion.

Also, the first touch portion comprises a first gesture unit provided in a concave curved surface shape and a first wheel unit inclined downward from the center while along a circumference of the first gesture unit, and the second touch portion comprises a second gesture unit provided in a convex curved surface shape and a second wheel unit inclined upward from the center while along a circumference of the second gesture unit.

Also, the first touch portion or the second touch portion comprises a concave shape, wherein the concave shape is gradually deepened from an edge unit toward the center or the concave shape maintains the same depth.

Also, the first gesture unit and the first wheel unit, and the second gesture unit and the second wheel unit receive an input of independent touch signals, respectively.

Also, a gradient of the first wheel unit is larger than a tangential gradient of the first gesture unit adjacent the first wheel unit, and a gradient of the second wheel unit is larger than a tangential gradient of the second gesture unit adjacent the second wheel unit.

Also, the mounting unit further comprises a button input tool provided in the surroundings of the mounting groove for performing a determined function.

Also, the button input tool comprises a touch button for performing a function determined by a user's touch and a press button for performing a determined function while changing a position by an external force applied by a user.

In accordance with another aspect of the present disclosure, a vehicle comprises a touch input device comprising a mounting unit in which a mounting groove is formed at an inner side of the mounting unit and a touch unit accommodated in the mounting groove and installed to be detachable from the mounting unit, wherein the touch unit comprises a first touch portion and a second touch portion, which are provided on different surfaces of the touch portion and allow a user to input a touch gesture, and the touch unit is selectively coupled to the mounting unit to allow the first touch portion to face an upper side or to allow the second touch portion to face the upper side; a display device; and a controller for operating the display device according to an input signal that is input to the touch input device.

Also, the touch input device is installed in a gear box.

BRIEF DESCRIPTION OF THE DRAWINGS

These and/or other aspects of the disclosure will become apparent and more readily appreciated from the following description of embodiments, taken in conjunction with the accompanying drawings of which:

FIG. 3 is a view illustrating inputting a gesture, FIG. 4 is a view illustrating inputting swiping and FIG. 5 is a plane view illustrating inputting a press.

DETAILED DESCRIPTION

Figure 1:
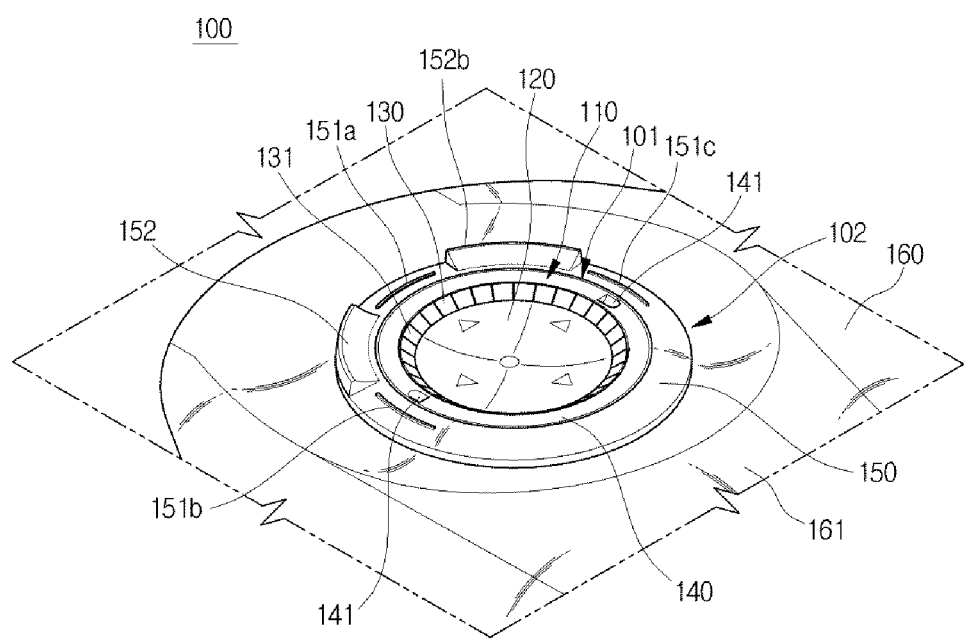
FIG. 1 is a perspective view of a touch input device in accordance with an embodiment of the present disclosure.

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. In the drawings, an illustration of a part unrelated to a description may be omitted to clarify the present disclosure and a size of a component may be exaggerated to aid understanding of the concepts of the disclosure.

FIG. 1 is a perspective view of a touch input device 100 in accordance with an embodiment of the present disclosure.

According to an embodiment, the touch input device 100 may include a mounting unit 102 and a touch unit 101 installed inside of the mounting unit 102. For example, a recessed space may be formed in the inside of the mounting unit 102 and the touch unit 101 may be placed in, and mounted to, the recessed space.

The touch unit 101 may include a touch portion 110. The touch portion 110 may be provided as a certain area in which a touch signal from a user is received. For example, as illustrated in the drawings, the touch portion 110 may be formed in the circular shape when viewing from the plane surface, but is not limited thereto. The touch portion 110 may be formed in various flat shapes including an oval shape.

The touch portion 110 may be a touch pad in which a signal is input when a user touches or closes by using a pointer, such as a finger or a touch pen. The user may input a desired instruction or a command by inputting a pre-determined touch gesture to the touch portion 110.

Regardless of the name of touch pad, the touch pad may include a touch film or a touch sheet including a touch sensor. The touch pad may include a touch panel, which may be a display device provided with a touchable screen.

Meanwhile, recognizing a position of the pointer in a state in which the pointer is adjacent to the touch pad without touching the touch pad may be referred to as "proximity touch", and recognizing a position of the pointer in a state in which the pointer is touched on the touch pad may be referred to as "contract touch". A position where proximity touch occurs may be a position vertically corresponding to the pointer with respect to the touch pad when the pointer is close to the touch pad.

The touch pad may use resistive technology, optical technology, capacitive technology, ultrasound technology and pressure technology, but is not limited thereto. A well-known technology may be used for the touch pad.

The touch unit 101 may include a coupling unit 140 surrounding the touch portion 110 and coupled to the mounting unit 102. For example, the coupling unit 140 may be formed in the shape of a ring surrounding the touch portion 110 and having a circular shape. A detailed description of a coupling of the coupling unit 140 will be described later.

The mounting unit 102 may include an edge unit 150 surrounding the touch unit 101. In the edge unit 150, key buttons or touch buttons 151 and 152 surrounding the touch unit 101 may be provided. That is, a user may input a signal including a gesture to the touch unit 101 or may input a signal by using the buttons 151 and 152 provided in the edge unit 150.

The edge unit 150 may be integrally formed with a mounting surface 160 or the edge unit 150 may be an additional member provided between the mounting surface 160 and the touch unit 101. In addition, when the edge unit 150 is omitted, the touch unit 101 may be installed in an inner side of the mounting surface 160.

The touch input device 100 according to an embodiment may further include a wrist supporting member 161 disposed in a lower portion of the touch unit 101 to support a user's wrist. At this time, a supporting surface of the wrist supporting member 161 may be disposed to be higher than the touch portion 110. This is because the wrist may be prevented from bending when the user touches the touch portion 110 in a state of supporting the wrist supporting member 161. Accordingly, while preventing user's musculoskeletal irritation that may occur in repeated processes of a touch input, a more comfortable sense of operation may be provided.

For example, as illustrated in the drawings, the wrist supporting member 161 may be integrally formed with the mounting surface 160 and be protruded from the mounting surface 160. Alternatively, the wrist supporting member 161 may be an additional member provided on the mounting surface 160.

Figure 2:
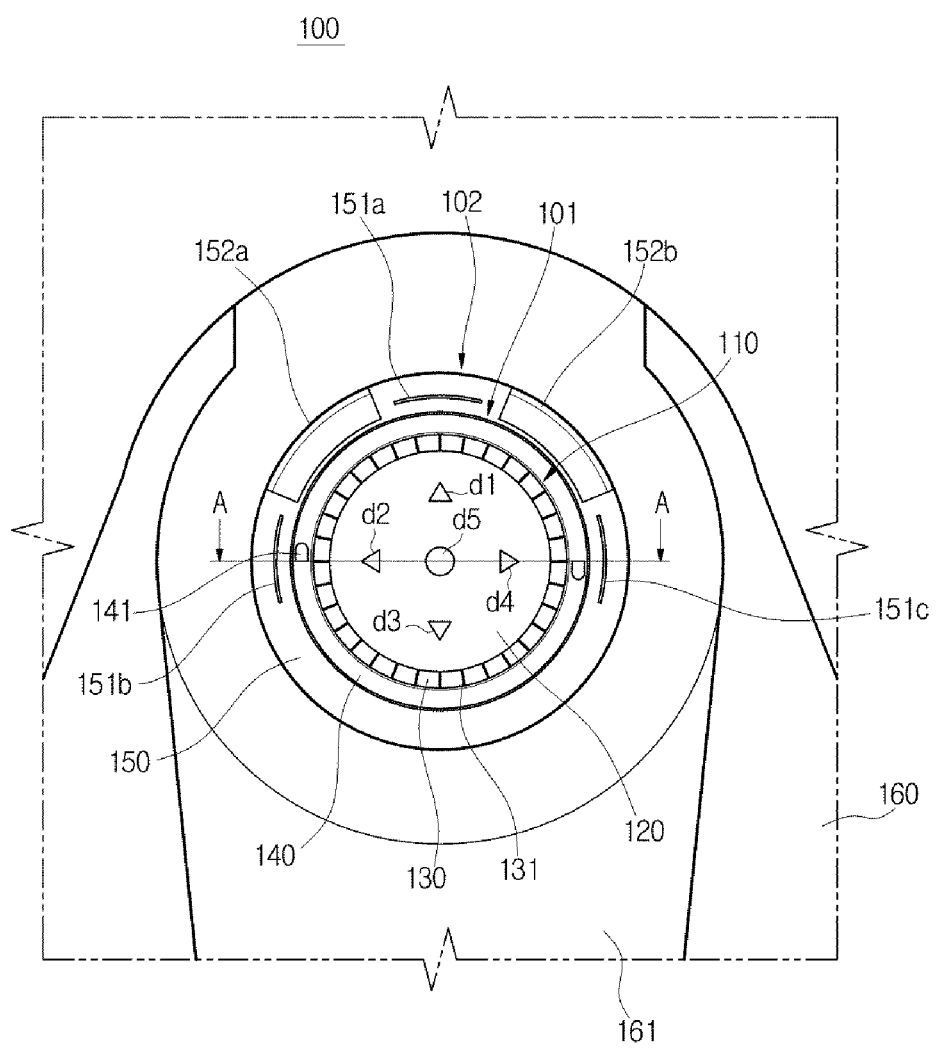
FIG. 2 is a plane view illustrating an operation of a touch unit in accordance with an embodiment of the present disclosure.

FIG. 2 is a plane view illustrating an operation of a touch unit 101 in accordance with an embodiment of the present disclosure.

The touch unit 101 according to an embodiment may include a controller configured to recognize a gesture input to the touch portion 110, and further configured to give a command to various devices by analyzing the gesture.

The controller may move a cursor or a menu on the display unit (not shown) according to a position of a pointer moved on the touch portion 110. That is, when the pointer moves up and down, a cursor displayed on the display unit may be moved in the same direction or a pre-selected menu may be moved to a sub menu from a top menu.

The controller may analyze a trajectory in which the pointer is moved, may match the trajectory against a pre-determined gesture, and then may operate a command which is corresponds to the pre-determined gesture. The gesture may be input in a way that the pointer performs flicking, rolling, a spin or a tap. In addition, the user may input a gesture by using a variety of touch input methods.

A flicking may represent a touch input method performed in a way that a pointer is moved in one direction while being contacted to the touch portion 110, and then the contact state is released, a rolling may represent a touch input method of drawing an arc with respect to the center of the touch portion 110, a spin may represent a touch input method of drawing a circle with respect to the center of the touch portion 110 and a tap may represent a touch input method of tapping the touch portion 110.

A user may input a gesture by using a multi-pointer input technology. The multi-pointer input technology may represent a method of inputting a gesture in a state in which two pointers are contacted simultaneously or sequentially. For example, a gesture may be input while two fingers are contacted to the touch portion 110. By using the multi-pointer input technology, a variety of commands or instructions, which are input by a user, may be provided.

Various touch input methods may include inputting a gesture e.g. numbers, letters or symbols as well as inputting a pre-determined gesture. For example, the user may input a command to the touch portion 110 by drawing Korean consonants and vowels, Alphabetic, Arabic numerals, four arithmetic symbols without change to their shapes. Instead of selecting a character or number intended to be input in the display unit, the user may directly input the character or number so that an input time may be reduced and an intuitive interface may be provided.

The touch portion 110 may be provided to allow pressing gestures or tilting gestures. Accordingly, a user may press or tilt a part of the touch portion 110 by pressing the touch portion 110 so that a user may input an operation signal corresponding to the pressing or the tilting. The pressing gesture may include a case in which the touch portion 110 is pressed in a flat manner and a case in which the touch portion 110 is pressed in a tilted manner. In addition, when the touch portion 110 is provided to be flexible, it may be possible to press a part of the touch portion 110.

For example, the touch portion 110 may be tilted in at least one direction (d1 to d4) with respect to a vertical direction to the touch surface. As illustrated in FIG. 2, the touch portion 110 may be tilted in four directions of up, down, left and right (d1 to d4), but the directions are not limited thereto. The touch portion 110 may be provided to be tilted in various directions according to embodiments. In addition, when pressing a central portion d5 of the touch portion 110, the touch portion 110 may be pressed in a flat manner.

A user may input a certain instruction or command by pressing or tilting the touch portion 110 with pressure. For example, the user may select a menu by pressing the central portion d5 of the touch portion 110, and may move a cursor upward by pressing an upper side d1 of the touch portion 110.

In addition, the touch input device 100 may further include buttons 151 and 152 provided in the mounting unit 102. The buttons 151 and 152 may be disposed around the touch unit 101, and particularly may be installed in the edge unit 150. A user may make an operation command rapidly by operating the buttons 151 and 152 without changing a hand position while inputting a gesture.

The buttons 151 and 152 may include a touch button 151 for performing a pre-determined function by a user's touch, or a physical button 152 for performing a pre-determined function while being transformed or having a position being changed by an external force from a user. The touch button 151 may receive a signal by only a touch of a pointer, and the physical button 152 may receive a signal while being transformed, or translated, by an external physical force. The physical button 152 may include a button provided to be clickable and a button provided to be tiltable.

In the drawing, five buttons 151a, 151b, 151c, 152a and 152b are illustrated. For example, each button 151 and 152 may include a home button 151a for moving to a home menu, a back button 151b for moving from a present screen to a previous screen, an option button 151c for moving to an option menu and two shortcut buttons 152a and 152b. The shortcut buttons 152a and 152b may be configured to directly move to the menu or the device by designating a menu or a device, which is often used by a user.

As for the touch buttons 151 and 152, the touch buttons 151a, 151b, and 151c may be disposed on an upper side and on both lateral sides of the touch portion 110, and the physical button 152a and 152b may be disposed between each touch button 151a, 151b and 151c. Since the physical buttons 152a and 152b are disposed between adjacent touch button 151a, 151b and 151c, it may be possible to prevent a mistaken operation of the touch buttons 151a, 151b and 151c in a different way from what a user intends.

Although not shown in the drawings, a variety of components related to operations may be embedded in the inside of the touch input device 100. A structure configured to allow the touch portion 110 to be pressed or tilted in five directions (d1 to d5) may be included in the touch input device 100. Although the structure is omitted in the drawings, there may be no difficulty in implementing the structure by using well-known techniques normally used in the related art.

In addition, a variety of semiconductor chips and Printed Circuit Boards (PCB) may be installed in the touch input device 100. The semiconductor chip may be installed in the PCB. The semiconductor chip may perform an information process or store data. The semiconductor chip may analyze a certain electrical signal, which is generated by an external force applied to the touch input device 100, a gesture recognized in the touch portion 110, and an operation of the button 151 and 152 provided in the touch input device 100, may generate a certain control signal according to the analyzed content, and may transmit the control signal to a controller or a display unit of another device.

The touch portion 110 may include a gesture unit 120 disposed the center of the touch portion 110 and a wheel unit 130 provided along an edge of the gesture unit 120. The wheel unit 130 may represent a portion to which a swipe gesture is input and the swipe gesture may represent inputting a gesture in a state in which a pointer is in connection with a touch pad.

When the touch portion 110 is formed in the shape of a circle, the gesture unit 120 may be formed in the shape of a portion of an inner surface of a spherical surface and the wheel unit 130 may be formed in the shape of an inclined surface that is inclined toward a lower side while surrounding a circumference of the gesture unit 120.

A user may input a swiping gesture along the wheel unit 130 provided in a circular shape. For example, the user may input a swiping gesture along the wheel unit 130 in a clockwise or counterclockwise direction. Meanwhile, a swiping gesture may include a circular motion gesture e.g. a rolling or a spin and a gesture motion of rubbing from the left side to the right side. According to an embodiment, a swiping gesture may be to as a gesture that is input in the wheel unit 130.

A swiping gesture input to the wheel unit 130 may be recognized as a different gesture by changing a start point and an end point of the swiping gesture. That is, a swiping gesture input in the wheel unit 130 placed in the left side of the gesture unit 120 and a swiping gesture input in the wheel unit 130 placed in the right side of the gesture unit 120 may lead to functions different from each other. In addition, in a state in which a user inputs a swiping gesture by contacting to the same point by using the finger, when an end point of the gesture, that is a position where the finger ends contact with the touch portion 110, is different, the gestures may be recognized differently from each other.

The wheel unit 130 may receive an input of tap gesture. Various commands and instructions may be input according to a position of the wheel unit 130 on which the user taps.

The wheel unit 130 may include a plurality of graduations 131. The graduations 131 may inform a relative position to a user by a visual or tactile manner.

For example, the graduations 131 may be provided to be engraved or embossed. Each of the graduations 131 may be disposed with a certain distance from each other or from the touch portion 110. Therefore, the user may intuitively recognize the number of the graduations 131 passed by the finger during a swiping, and thus the user may accurately adjust the distance of swiping gesture.

For example, a cursor displayed on the display unit may be moved according to the number of the graduations 131 passed by the finger during a swiping gesture. In a state in which various characters are consecutively disposed on the display device, a selected character may be moved by a single space to the next space each time the user passes a single graduations 131 while performing a swiping gesture.

According to an embodiment, the gradient of the wheel unit 130 may be provided to have a larger gradient than a tangential gradient of the gesture unit 120 in the boundary between the wheel unit 130 and the gesture unit 120. When a user inputs a gesture in the gesture unit 120, the user may intuitively recognize the touch area of the gesture unit 120 due to the gradient difference between the wheel unit 130 and the gesture unit 120.

Meanwhile, while a gesture is input to the gesture unit 120, a touch of the wheel unit 130 may be not recognized. Therefore, although the user touches the area of the wheel unit 130 during inputting the gesture to the gesture unit 120, a gesture input to the gesture unit 120 and a gesture input to the wheel unit 130 may be not overlapped.

The gesture unit 120 and the wheel unit 130 may be integrally formed. The gesture unit 120 and the wheel unit 130 may be provided with each touch sensor, or a single touch sensor. When the gesture unit 120 and the wheel unit 130 are provided with a single touch sensor, the controller may distinguish the touch area of the gesture unit 120 from the touch area of the wheel unit 130 and thus may distinguish a gesture input signal of the gesture unit 120 from a gesture input signal of the wheel unit 130.

Figure 3:
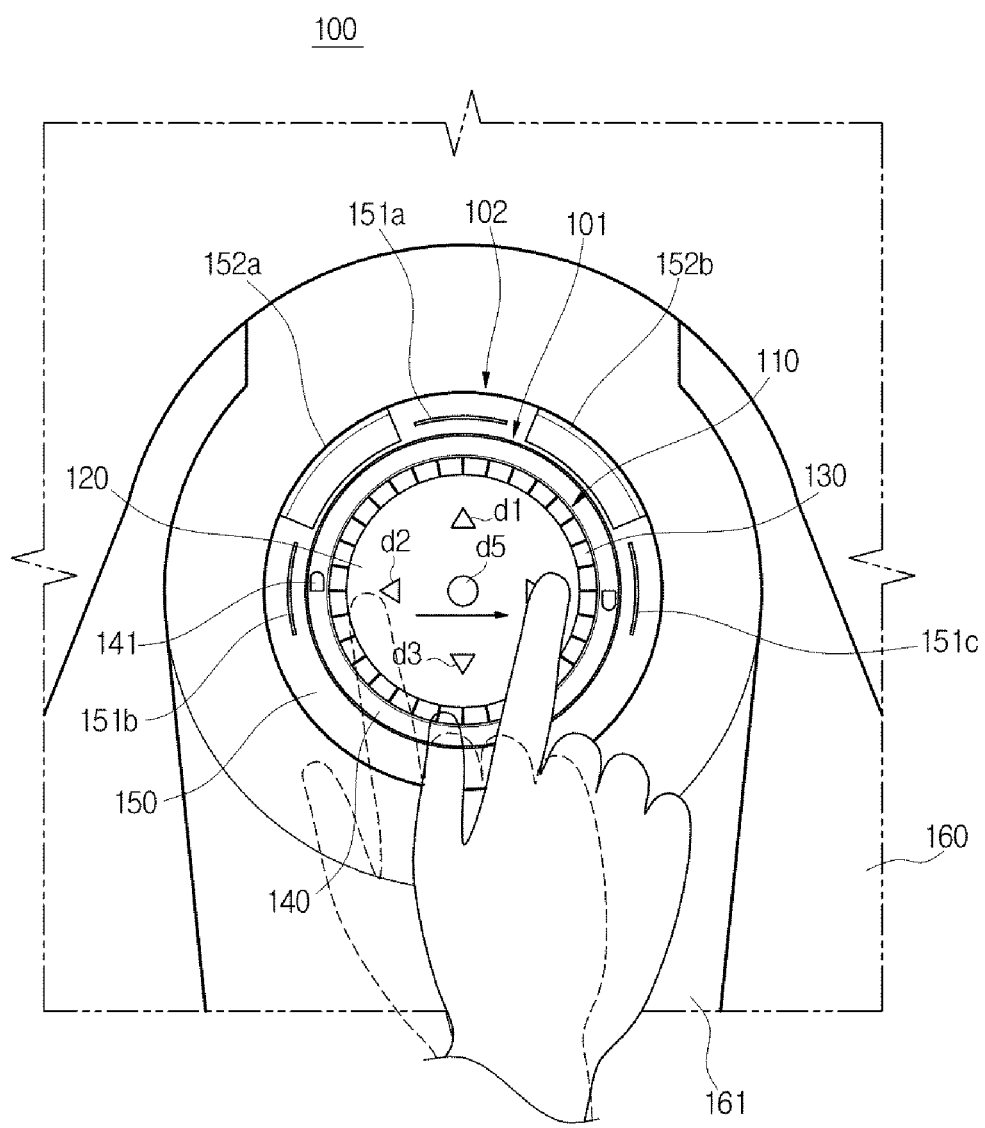
FIGS. 3 to 5 are views illustrating an operation of a touch input device in accordance with an embodiment of the present disclosure. In particular.
Figure 4:
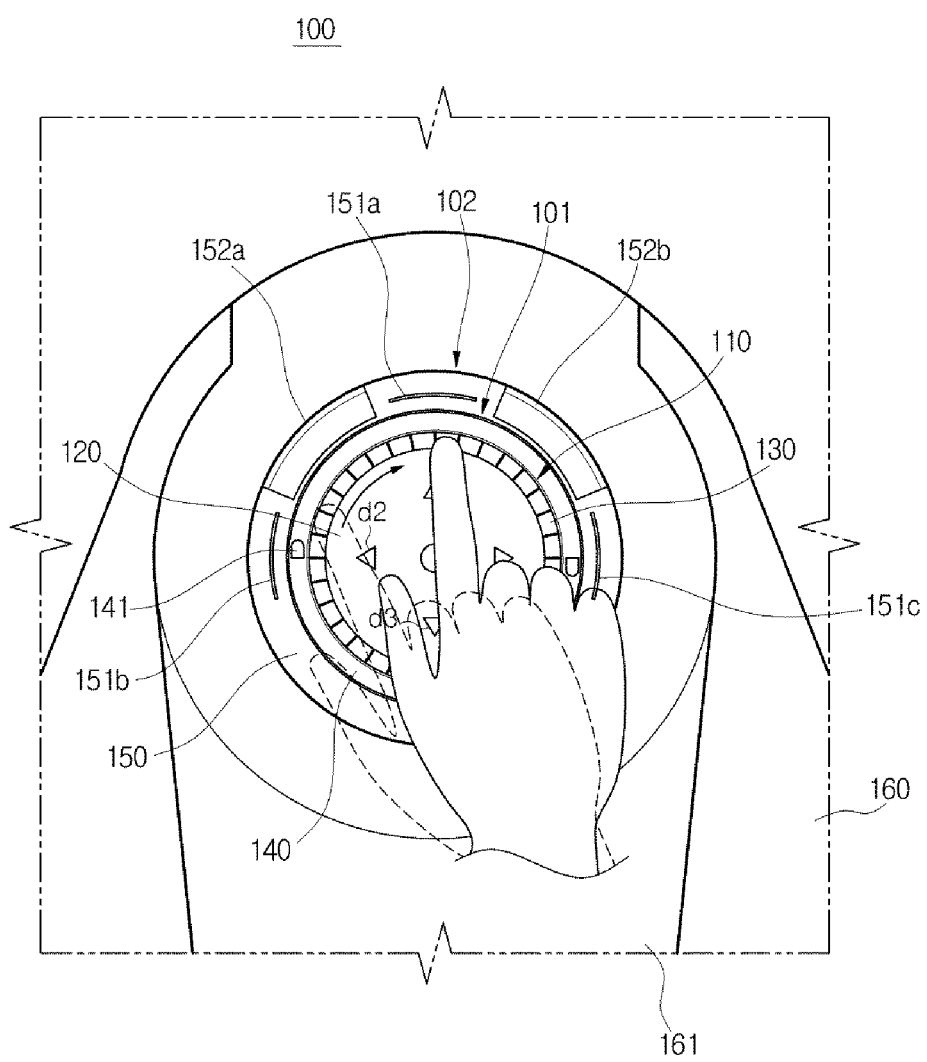
Figure 5:
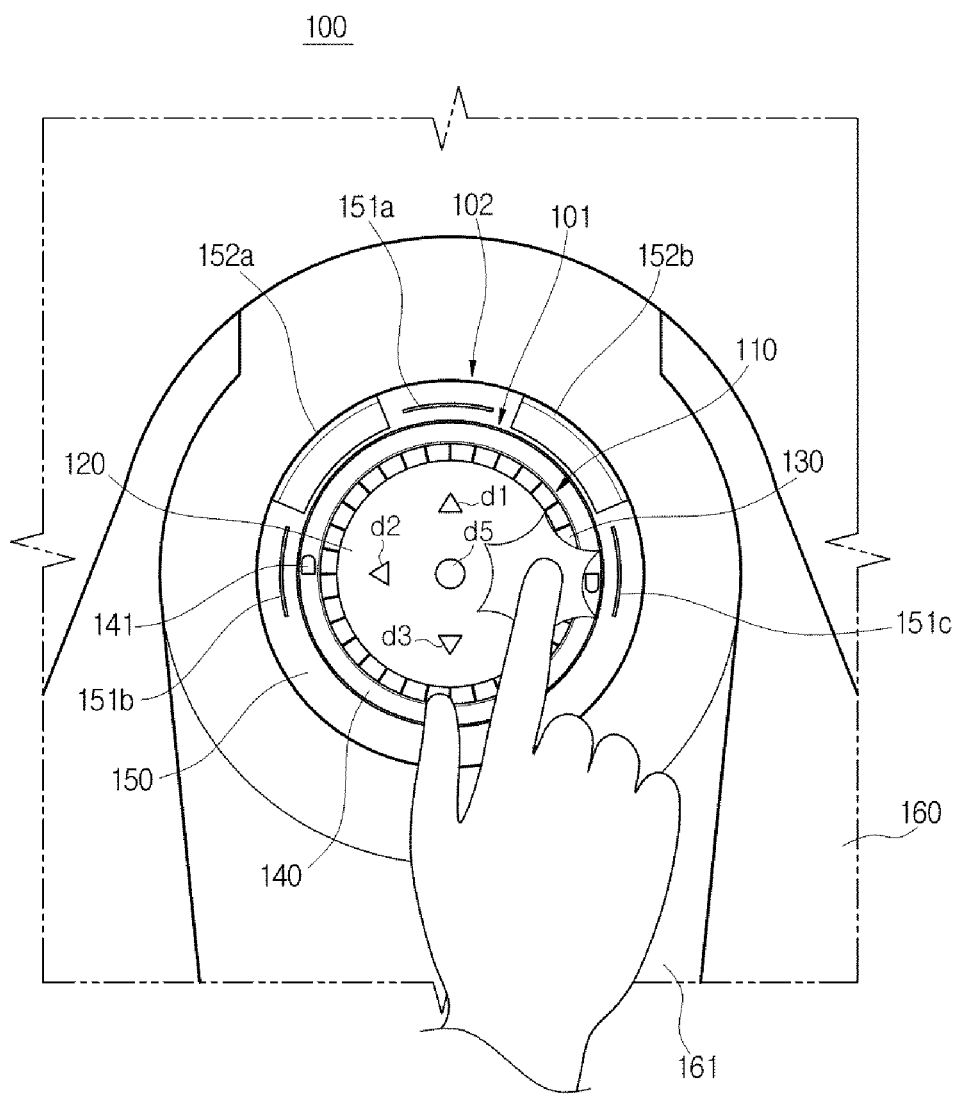

FIGS. 3 to 5 are views illustrating an operation of a touch input device 100 in accordance with an embodiment of the present disclosure. In particular, FIG. 3 is a view of inputting a gesture, FIG. 4 is a view of inputting swiping and FIG. 5 is a plane view of inputting a press.

Referring to FIG. 3, a user may input an operation command by drawing a gesture on the gesture unit 120. FIG. 3 illustrates a flicking gesture performed in a way that a pointer is moved from the left side to the right side.

Referring to FIG. 4, a user may input an operation command by swiping the wheel unit 130. FIG. 4 illustrates a swiping gesture performed in a way that a pointer starts a contact in the left wheel unit 130 and then moves to the upper side along the wheel unit 130.

Referring to FIG. 5, a user may input an operation command by pressing the gesture unit 120. FIG. 5 illustrates a gesture of pressing the left side of the gesture unit 120.

Figure 6:
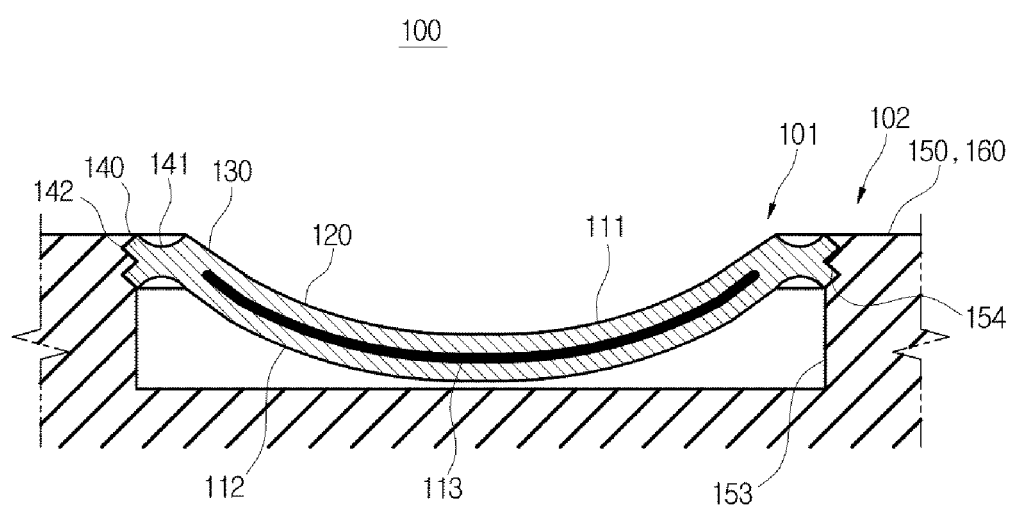
FIG. 6 is a cross-sectional view taken along line A-A of FIG. 2 according to an embodiment of the present disclosure.

FIG. 6 is a cross-sectional view taken along line A-A of FIG. 2.

The touch portion 110 may include a lower portion than the boundary of the coupling unit 140. That is, a touch surface of the touch portion 110 may be provided to be lower than the boundary line between the touch portion 110 and the coupling unit 140. Although the drawings illustrate that the touch portion 110 is continuously inclined downward from the boundary with the coupling unit 140 without a step, the touch portion 110 may be inclined downward from the boundary with the coupling unit 140 with a step.

Since the touch portion 110 may include a lower portion than the boundary line of the coupling unit 140, a user may recognize the area and the boundary of the touch portion 110 by tactility. When a gesture is performed in the center portion of the touch portion 110, a recognition rate may be increased. In addition, although a similar gesture is input, when a gesture is input in a different place, there may be a risk that the gesture is recognized as a different command. This risk may occur when a user inputs a gesture without looking at the display device. If a user can intuitively recognize the center and the edge by tactility in a state in which the user inputs a gesture while looking at the display device or while focusing on the outside of the vehicle, the user may input a gesture to an accurate position. Accordingly, the input accuracy of the gesture may be improved.

The touch portion 110 may have a concave shape. The concave shape may represent a dent or a recessed shape, and may include a dent shape to be inclined or to have a step as well as a dent shape to be circle.

The touch portion 110 may include a concave surface shape. For example, according to an embodiment, the touch portion 110 may be provided with a concave surface having a certain curvature as illustrated in the drawings. That is, the touch portion 110 may include a shape of a certain part of an inner surface of a spherical surface. When the curvature of the touch portion 110 is constant, a sense of difference in the operation may be minimized when a user inputs a gesture.

While the touch portion 110 includes a concave shape, the touch portion 110 may be provided to be gradually deepened from an edge unit toward the center or to maintain the same depth throughout. That is, the touch portion 110 may be provided to not have a convex surface. When the touch portion 110 includes a convex surface, it may interrupt a precise touch input since a trajectory in which a user naturally draws a gesture is different from a curve of the touch surface. For example, the touch portion 110 may be provided in a way that the center thereof is the deepest and a curvature is gradually reduced from the edge portion to the center.

Meanwhile, the convex surface may represent a convex area in the entire touch area of the touch portion 110 other than a convex point in a local area. Therefore, according to an embodiment, a small protrusion may be formed in the middle of the touch portion 110 so that a user intuitively recognizes a position of the center by feeling the small protrusion or the touch portion 110 may be formed in a protruding manner, whereby concentric thin creases may be protruded in the touch portion 110.

The curved surface of the touch portion 110 may have various curvatures. For example, the touch portion 110 may have a concave curved surface having a gradient being reduced when approaching the center. That is, a curvature of an area adjacent to the center may be small (it may represent that the radius of curvature is large) and a curvature of an area, which is far from the center, may be large (it may represent that the radius of curvature is small). As mentioned above, the curvature of the center of the touch portion 110 may be smaller than the curvature of the edge portion so that it may be easy to input a gesture to the center by using a pointer. Since the curvature of the edge portion may be larger than the curvature of the center, a user detects the curvature by touching the edge portion so that a user easily recognizes the position of the center without looking at the touch portion 110.

As for the touch input device 100 according to an embodiment, the touch portion 110 may include a concave curved surface, and thus when inputting a gesture, a sense of touch or a sense of operation felt by the user may be improved. The curved surface of the touch portion 110 may be provided to be similar to a trajectory which is made by a movement of the end of the finger when a person moves the finger or rotates or twists a wrist including stretching the finger, in a state in which a person fixes her/his wrist.

In comparison with a conventional plane touch unit, the touch portion 110 having a concave surface may be formed in an ergonomic manner. That is, stress applied to a wrist may be reduced as well a sense of operation of a user may be improved. In addition, in comparison with a case of inputting a gesture to a plane touch unit, the input accuracy may be enhanced.

The touch portion 110 may be formed in a circular shape. When the touch portion 110 is provided in a circular shape, a concave surface may be easily formed. In addition, since the touch portion 110 is formed in a circular shape, a user may detect the circular touch area of the touch portion 110 by tactility, and thus a user may easily input a circular gesture motion e.g. a rolling or a spin gesture.

Since the touch portion 110 has a curved surface, a user may intuitively recognize that a finger is placed in which position of the touch portion 110. The touch portion 110 may have a curved surface so that a gradient may vary according to a portion of the touch portion 110. Therefore, the user may intuitively recognize that a finger is placed in a particular position of the touch portion 110 through a sense of gradient, which is felt through the finger.

Accordingly, when the user inputs a gesture to the touch portion 110 in a state in which the user stares at a point besides the touch portion 110, a feedback related to a position of the touch portion 110 where the finger is placed, may be provided to help the user to input a needed gesture, and may improve the input accuracy of a gesture. For example, when feeling that a gradient of the touch portion 110 is flat, which may be felt through the finger, the user may intuitively recognize to touch the center of the touch portion 110, and when detecting a direction of a gradient of the touch portion 110, which is felt through the finger, the user may intuitively recognize that the finger is placed in a direction of the center.

Meanwhile, a diameter and a depth of the touch portion 110 may be formed in an ergonomic manner. For example, a diameter of the touch portion 110 may be selected from approximately 50 mm to approximately 80 mm. Given the average length of a finger of an adult, a range of the finger, which is made by the natural movement of the finger at a time of fixing a wrist, may be selected within approximately 80 mm. Therefore, in a state of in which a diameter of the touch portion 110 is larger than approximately 80 mm, a hand may be unnaturally moved and a wrist may be excessively used when a user draws a circle along an outer edge of the touch portion 110.

In contrast, when a diameter of the touch portion 110 is less than approximately 50 mm, an area of the touch area may be reduced and thus a diversity of possible input gestures may be reduced. In addition, the gesture may be made in a narrow area and thus gesture input errors may be increased.

In addition, when the touch portion 110 is provided in a spherical surface, a value acquired by dividing a depth by a diameter of the touch portion 110 may be selected from approximately 0.04 to approximately 0.1. The value acquired by dividing a depth by a diameter of the touch portion 110 may represent a degree of bend of a curved surface. That is, in the same diameter, as a value acquired by dividing a depth by a diameter of the touch portion 110 is larger, the curved surface of the touch portion 110 may have a more concave, or rounded, shape, and in contrast, as a value acquired by dividing a depth by a diameter of the touch portion 110 is smaller, the curved surface of the touch portion 110 may have more flat shape.

When a value acquired by dividing a depth by a diameter of the touch portion 110 is larger than approximately 0.1, the curvature of the concave shape may be large and thus a user's sense of touch may become uncomfortable. Therefore, it may be appropriate that the curved surface of the touch portion 110 is identical to the curvature of a curved line, which is drawn by the end of the finger in the natural movement of the user's finger. However, when the value acquired by dividing a depth by a diameter of the touch portion 110 is larger than approximately 0.1, the user may feel an artificial sense of operation when a user moves the finger along the touch portion 110. In addition, when the user unconsciously and naturally moves the finger, the end of the finger may be separated from the curved surface. Accordingly, a touch of a gesture may be discontinued and thus a recognition error may occur.

In contrast, when the value, acquired by dividing a depth by a diameter of the touch portion 110 is less than approximately 0.04, a user may hardly feel a difference in a sense of operation between drawing a gesture on the curved surface and drawing a gesture on a flat surface.

A touch pad used in the touch portion 110 provided in a curved surface may recognize a touch by using an optical technology. For example, on a rear surface of the touch portion 110, an Infrared Light Emitting Diode (IR LED) and a photodiode array may be disposed. The IR LED and photodiode array may acquire an infrared image reflected by a finger, and a controller may extract a touch point from the acquired image.

Figure 7:
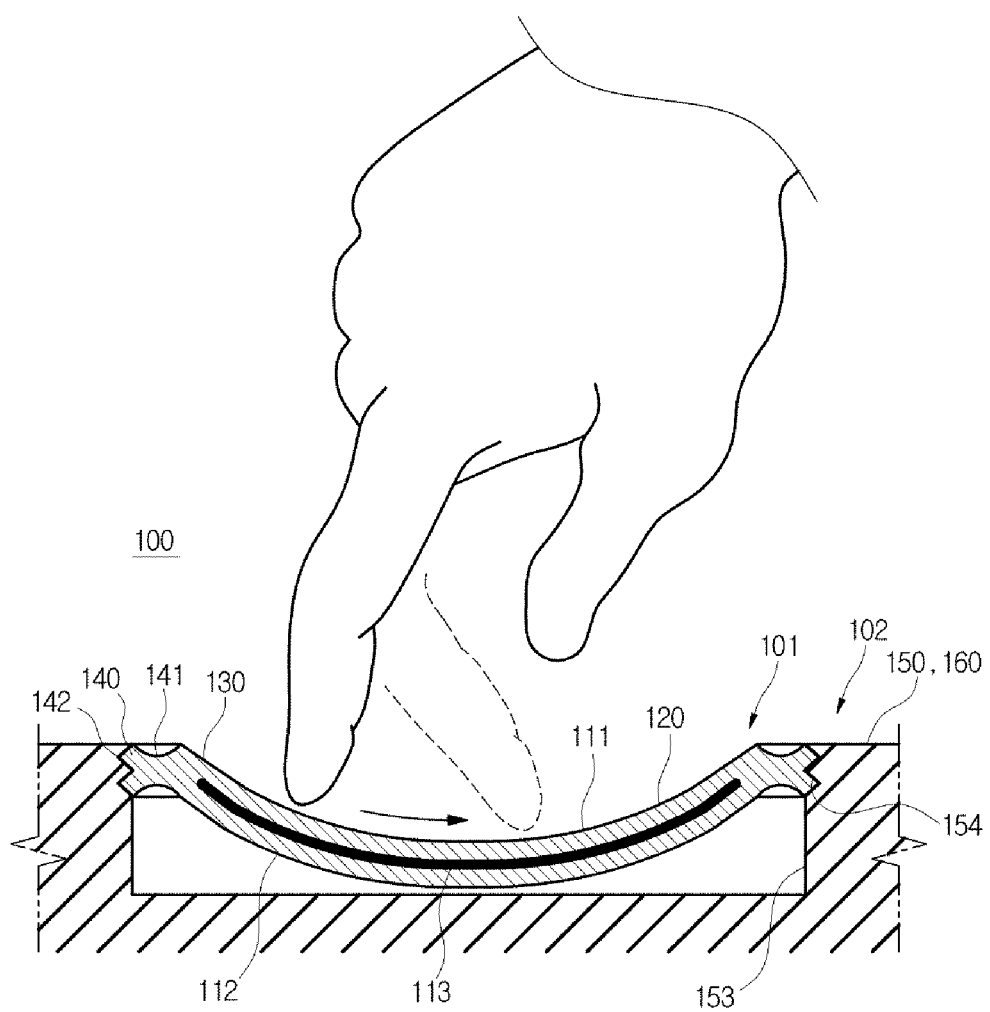
FIG. 7 is a view illustrating a finger's trajectory when a user inputs a gesture in upward and downward directions in accordance with an embodiment of the present disclosure.
Figure 8:
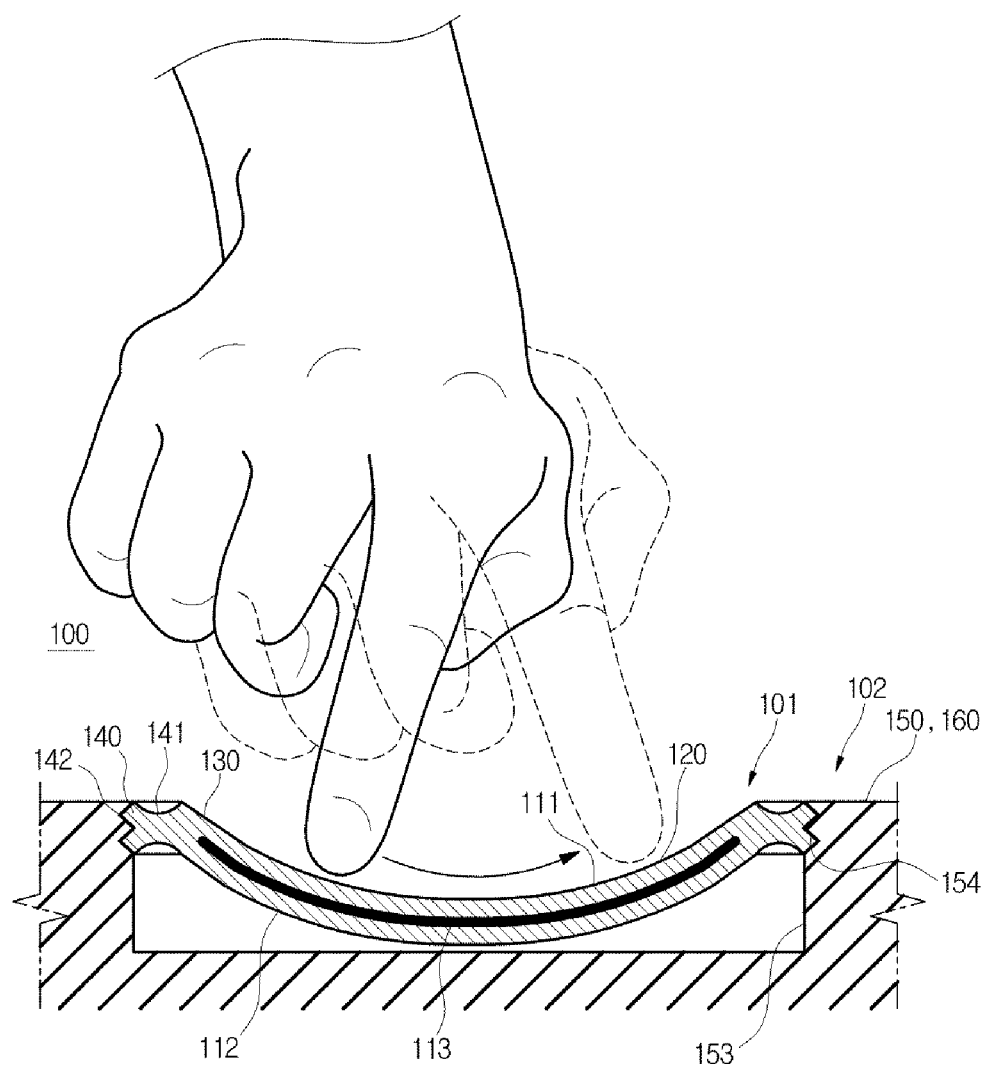
FIG. 8 is a view illustrating a finger's trajectory when a user inputs a gesture in the left and right directions according to an embodiment of the present disclosure.

FIG. 7 is a view illustrating a finger's trajectory when a user inputs a gesture in upward and downward directions and FIG. 8 is a view illustrating a finger's trajectory when a user inputs a gesture in the left and right directions.

According to an embodiment, the touch portion 110 may include a concave surface. The curvature of the touch portion 110 may be determined to allow a user to easily input a gesture.

Referring to FIG. 7, a user may input a gesture with a natural movement of a finger without moving or bending a joint other than the finger when the user moves the finger up and down. In the same way, referring to FIG. 8, a user may input a gesture with a natural movement of the finger and the wrist without excessively twisting the wrist when the user moves the finger to the left side and the right side. A shape of the touch portion 110 may be provided in an ergonomic manner so that a user feel less fatigue over a long period of time, and a user's musculoskeletal disease, which may otherwise occur in the wrist or other joint, may be prevented.

Figure 9:
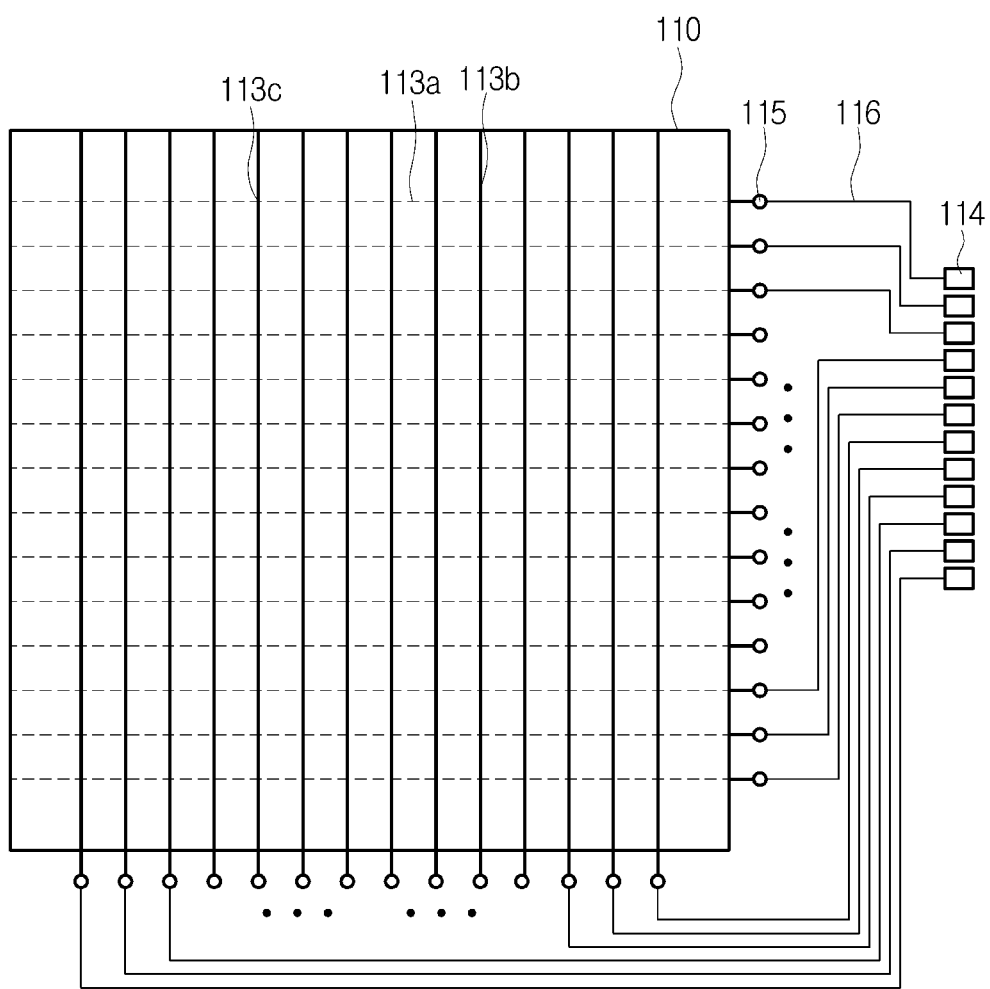
FIG. 9 is a view illustrating a detection pattern structure of a touch portion in accordance with an embodiment of the present disclosure.

FIG. 9 is a view illustrating a detection pattern structure of a touch portion 110 in accordance with an embodiment. FIG. 9 is a view to illustrate an operating method of the touch input device 100.

The touch input device 100 may include the touch portion 110 making a contact with a user's input tool (e.g. the finger or a touch pen), a first and a second detection pattern 113a and 113b integrally formed with the touch portion 110 or provided in a lower side of the touch portion 110, and a wiring unit 116 and a connection unit 114 both of which are connected to the detection pattern.

The first detection pattern 113a and the second detection pattern 113b may be formed to have a certain pattern so that a user detects a variation of capacitance when a user contacts the touch input device 100 by using the finger and a touch pen to detect a position thereof. Contact (touch) may be defined as including a direct contact and an indirect contact. That is, the direct contact may represent a case in which an object makes contact with the touch input device 100, and the indirect contact may represent a case in which an object does not make contact with the touch input device 100 but the object is placed in a range in which a detection pattern detects the object.

The first detection pattern 113a may be arranged to be divided into a certain section in a first direction (a horizontal direction in the drawings) and the second detection pattern 113b may be arranged to be divided into a certain section in a direction that is different from the first direction (a vertical direction in the drawings). The first detection pattern 113a and the second detection pattern 113b may be provided on different layers, and may form an intersection portion 113c. In the intersection portion 113c, the first detection pattern 113a and the second detection pattern 113b may be not directly connected to each other but the first detection pattern 113a and the second detection pattern 113b may be overlapped with each other with respect to an insulation unit.

The intersection portion 113c may determine a resolution of the touch portion 110, and may be recognized as coordinates. That is, a case in which an input tool makes contact with any one of the intersection portion 113c may be distinguished from a case in which an input tool makes contact with the intersection portion 113c adjacent to the input tool, and thus it may be found that the input tool makes contact with the intersection portion 113c. Therefore, the resolution of the touch portion 110 may be increased as the number of the intersection portion 113c is increased in the same area.

One end of the first and second detection pattern 113a and 113b may be connected to the wiring unit 116 formed of a metal wiring. A first connection unit 114 may be provided in an end of the wiring unit 116 and each end of the wiring unit 116 may be connected to a circuit board (not shown) via the first connection unit 114.

A bonding connection unit 115 may be provided in one end portion of the first and second detection pattern 113a and 113b. The bonding connection unit 115 may be provided to be wider than a width of the first and second detection pattern 113a and 113b so that the wiring unit 116 is easily connected thereto. The bonding connection unit 115 and the wiring unit 116 may be bonded to each other through a conductive adhesive (e.g. a solder).

The wiring unit 116 may transmit a detection signal of the detection pattern to the circuit board through the first connection unit 114. The wiring unit 116 and the first connection unit 114 may be formed of a conductive material.

When the input tool makes contact with one area of the touch portion 110, a capacitance of the intersection portion 113c may be reduced, information related to the capacitance may reach to circuit board, which is operated by the controller through the wiring unit 116 and the first connection unit 114, and the controller may determine with which position the input tool makes contact. In addition, it may be configured that the capacitance may be reduced when the input tool closes to one area of the touch portion 110. In this case, the controller may determine to which position the input tool has closed to.

Hereinafter a detailed description of the touch unit 101 will be described with reference to FIGS. 10 to 12.

Figure 10:
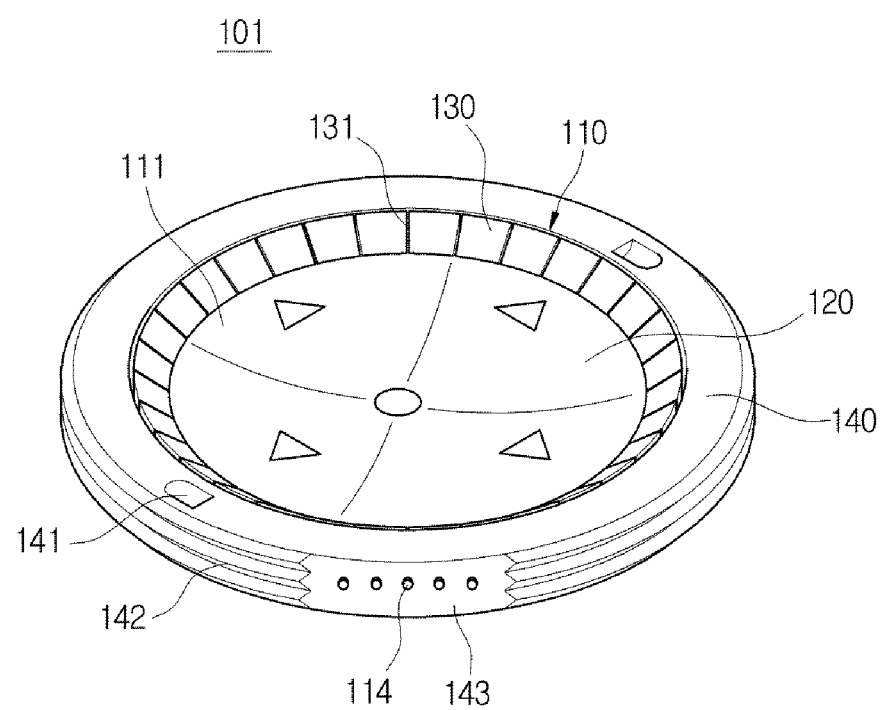
FIG. 10 is a perspective view of a first touch portion of the touch unit in accordance with an embodiment of the present disclosure.
Figure 11:
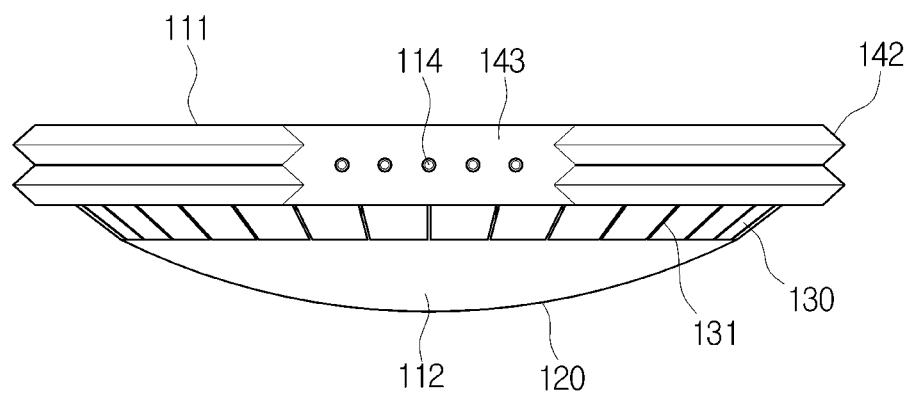
FIG. 11 is a lateral view of a touch unit in accordance with an embodiment of the present disclosure.
Figure 12:
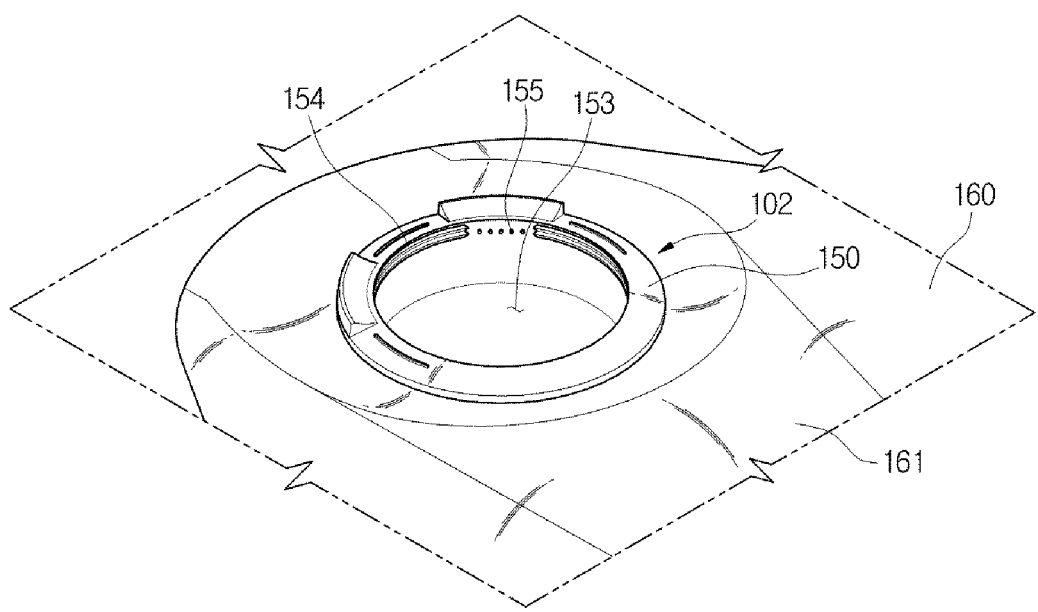
FIG. 12 a perspective view illustrating a case in which a touch unit is removed from FIG. 1 according to an embodiment of the present disclosure.

FIG. 10 is a perspective view of a first touch portion 111 of the touch unit 101 in accordance with an embodiment, and FIG. 11 is a lateral view of a touch unit 101. FIG. 12 a perspective view illustrating a case in which a touch unit 101 is removed from FIG. 1.

The touch unit 101 may include a first touch portion 111 provided in one surface of the touch portion 110, a second touch portion 112 provided on the other surface of the touch portion 110, a detection pattern 113 provided between the first touch portion 111 and the second touch portion 112 and a first connection unit 114 connected to the detection pattern 113.

The touch unit 101 may be detachably coupled to the mounting unit 102. For example, a circular mounting groove 153 may be formed in the mounting unit 102 and the touch unit 101 may be accommodated in the inside of the mounting groove 153.

The touch unit 101 may be screw-coupled to the mounting unit 102. The touch unit 101 may be free to be separated from, and coupled to, the mounting unit 102. For example, a first screw unit 142 may be formed at an outer circumferential surface of the touch unit 101 and a second screw unit 154 corresponding to the first screw unit 142 may be formed on an inner circumferential surface of the mounting groove 153.

When the touch unit 101 is coupled to the mounting unit 102, the touch unit 101 may be coupled to the mounting unit 102 from an upper side and a lower side. That is, the touch unit 101 may be coupled to the mounting unit 102 to allow the first touch portion 111 to face the upper side or to allow the second touch portion 112 to face the upper side. For example, the first screw unit 142 may be coupled to the second screw unit 154 regardless of the upper direction and the lower direction. That is, the first screw unit 142 may be coupled to the second screw unit 154 in a state in which the first touch portion 111 faces the upper side, or in contrast in a state in which the second touch portion 112 faces the upper side.

Meanwhile, the touch unit 101 and the mounting unit 102 may be coupled to each other by using various coupling methods e.g. a clip coupling, a press-fitting, or a sliding as well as a screw-coupling.

A connection surface 143 may be formed in an outer circumferential surface of the touch unit 101, and the first connection unit 114 connected to the detection pattern 113 may be provided in the connection surface 143. The connection surface 143 and the first screw unit 142 may be separated from each other. For example, the first screw unit 142 may be formed in an area separate from the connection surface 143 in a circumferential direction of the touch unit 101. In this case, when the touch unit 101 is coupled to the mounting unit 102, the touch unit 101 may be rotated and coupled to the mounting unit 102 through a rotation that is less than one full rotation. That is, the touch unit 101 may be rotated by a rotation with an angle in which the first screw unit 142 is formed and then coupled to the mounting unit 102.

Unlike the drawings, when the first screw unit 142 is continuously formed in a circumference of the touch unit 101, the first connection unit 114 may be formed in a portion of, or a halfway around, the first screw unit 142, or the first connection unit 114 may be provided in an upper side or a lower side of the first screw unit 142.

The first connection unit 114 may be connected to a second connection unit 155 provided in an inner circumferential surface of the mounting groove 153. Particularly, when the first connection unit 114 of the touch unit 101 is connected to the second connection unit 155 of the mounting unit 102, the coupling may be completed.

Referring to the drawings, the first screw unit 142 may not be formed in an area in which the first connection unit 114 is provided, and the second screw unit 154 may not be formed in an area in which the second connection unit 155 is provided. Therefore, when the first connection unit 114 and the second connection unit 155 make contact with each other, the screw-coupling may be completed. Alternatively, a stopper (not shown) may be formed in one side of the first screw unit 142 or the second screw unit 154 so that the touch unit 101 is not rotated further when the first connection unit 114 and the second connection unit 155 make contact with each other.

The first connection unit 114 may be a pin-type connector and the second connection unit 155 may be a pad-type connector configured to transmit an electrical signal to the controller by being connected to the first connection unit 114. An inner side of the first connection unit 114 may be supported by an elastic member (not shown) and thus the first connection unit 114 may be moved to an outside of a surface of the touch unit 101 in a sliding manner. Particularly, the first connection unit 114 may be placed in the inside of the connection surface 143 when the touch unit 101 is screw-coupled to the mounting unit 102, and then the first connection unit 114 may be protruded by an elastic force of the elastic member so as to be connected to the second connection unit 155 when the coupling of the touch unit 101 is completed.

The detection pattern 113 may be provided between the first touch portion 111 and the second touch portion 112 so as to recognize a touch signal input from both surfaces of the first touch portion 111 and the second touch portion 112.

That is, when the touch unit 101 is mounted to allow the first touch portion 111 to face the upper side, a signal input to the first touch portion 111 may be transmitted to the controller through the detection pattern 113 and the first and second connection unit 114 and 155. When the touch unit 101 is mounted to allow the second touch portion 112 to face the upper side, a signal input to the second touch portion 112 may be transmitted to the controller through the detection pattern 113 and the first and second connection unit 114 and 115.

Unlike the drawings, the detection pattern 113 configured to recognize a touch signal of the first touch portion 111 may be separately provided from the detection pattern 113 configured to recognize a touch signal of the second touch portion 112. For example, a detection pattern having two layers may be provided. In such a case, an additional member may be inserted between two layers to prevent a signal disturbance between two layers of the detection pattern. A control means configured to activate only the detection pattern, which recognizes a touch portion disposed to face the upper side, between two layers of the detection pattern may be used.

A touch surface of the first touch portion 111 and the second touch portion 112 may be provided in differing shapes. For example, the first touch portion 111 may have a concave shape and the second touch portion 112 may have a convex shape. Alternatively, the first touch portion 111 or the second touch portion 112 may have a flat shape.

The shape of the first touch portion 111 and the second touch portion 112 may correspond to each other. That is, a distance between the first touch portion 111 and the second touch portion 112 may be constant along the touch area. The detection pattern 113 may be provided in the middle of the first touch portion 111 and the second touch portion 112. That is, a distance from the first touch portion 111 to the detection pattern 113 may be identical to a distance from the second touch portion 112 to the detection pattern 113.

A locking unit 141 held by a user when a user couples the touch unit 101 may be formed in the coupling unit 140. For example, the locking unit 141 may be a locking groove recessed in one surface of the coupling unit 140. Unlike the drawings, a locking protrusion may be provided to be protruded on one surface of the coupling unit 140.

In addition, the locking unit 141 may be provided on both surfaces of the coupling unit 140. This is because the touch unit 101 may be coupled in an upper side and a lower side of the touch unit 101.

Figure 13:
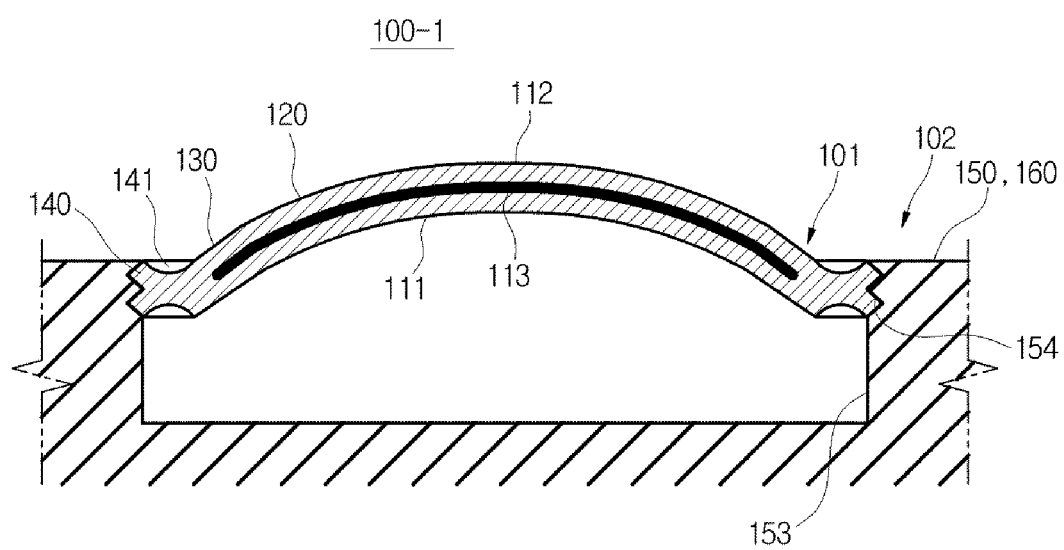
FIG. 13 is a cross-sectional view illustrating a state in which a touch unit is inversely installed from the embodiment shown in FIG. 6.

FIG. 13 is a cross-sectional view illustrating a state in which the touch unit 101 is inversely installed relative to the embodiment shown in FIG. 6.

According to an embodiment, a touch input device 100-1 may be installed to allow the first or second touch portion 110, 111 or 112 to face an upper side.

The second touch portion 112 may include a portion of a convex spherical surface. The first touch portion 111 may include a portion of a concave spherical surface so that a sense of operation and intuitiveness are improved. However, the shape of the second touch portion may relive a difficulty, which may occur in inputting a touch signal on a concave surface due to a user's nail, or the shape of the second touch portion 112 may be proper when a user prefers a convex surface rather than a concave surface.

Therefore, according to a user's selection, the touch unit 101 may be coupled to allow the first touch portion 111 having a concave shape to face the upper side or the touch unit 101 may be coupled to allow the second touch portion 112 having a convex shape to face the upper side.

Figure 14:
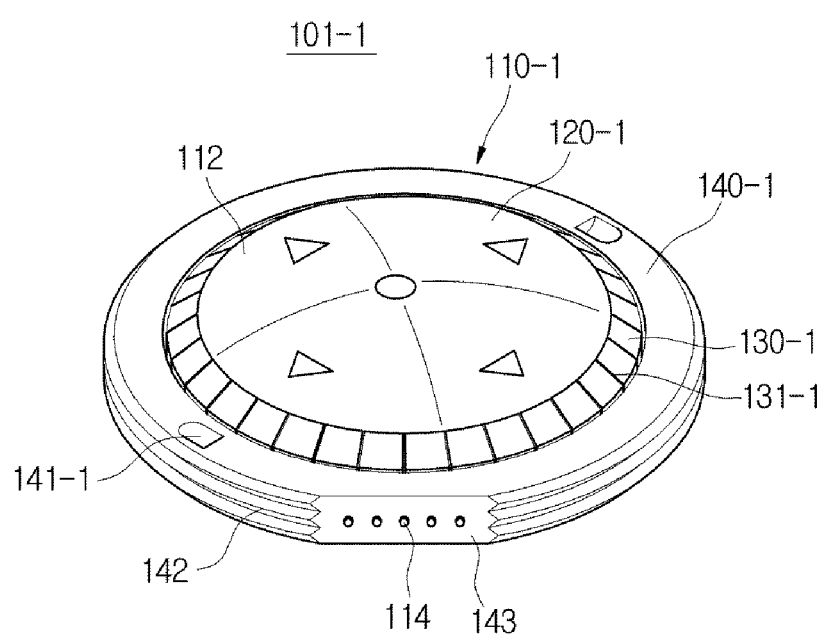
FIG. 14 is a perspective view of a second touch portion of a touch unit in accordance with an embodiment of the present disclosure.

FIG. 14 is a perspective view of a second touch portion 112 of a touch unit 101-1 in accordance with an embodiment of the present disclosure.

The touch portion 110-1 of the touch unit 101-1 may include a gesture unit 120-1 disposed in the center of the touch unit 101-1 and a wheel unit 130-1 provided along an edge of the gesture unit 120-1. The wheel unit 130-1 may include a plurality of graduations 131-1.

When the touch portion 110-1 is provided in a circular shape, the gesture unit 120-1 may be provided as a portion of an outer surface of a spherical surface, and the wheel unit 130-1 may be provided as an inclined surface surrounding a circumference of the gesture unit 120-1 while being inclined downward.

A locking unit 141-1 held by a user when a user couples the touch unit 101-1 may be formed in a coupling unit 140-1. For example, the locking unit 141-1 may be a locking groove recessed on one surface of the coupling unit 140-1.

Figure 15:
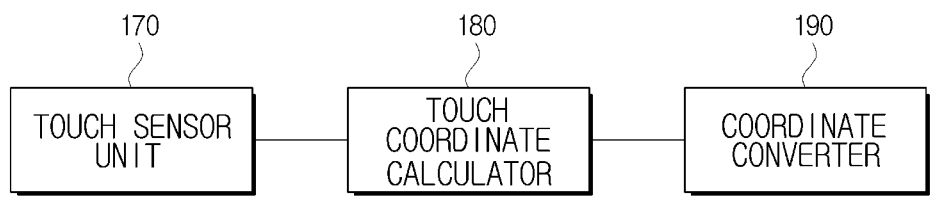
FIG. 15 is a schematic view of a configuration of a system allowing a touch input device to input a touch signal in accordance with an embodiment of the present disclosure.

FIG. 15 is a view of a configuration of a system allowing a touch input device 100 to input a touch signal in accordance with an embodiment of the present disclosure.

The touch input device 100 may include a touch sensor unit 170 for recognizing a user's touch signal, a touch coordinate calculator 180 for determining which position of the touch sensor unit 170 a touch signal is input, and a coordinate converter 190 for converting a touch coordinated according to whether a touch signal is input to the first touch portion 111 or the second touch portion 112.

The touch sensor unit 170 may include a detection pattern 113. The detection pattern 113 may include a first and a second detection pattern 113*b* and 113*b* which may be disposed to be perpendicular to each other, and an intersection portion 113*c* in which two detection patterns may be crossed with each other. In this case, the intersection portion 113*c* may be used as a touch point to distinguish a touch signal.

The touch coordinate calculator 180 may calculate and determine to what of the detection pattern 113 a touch signal is input. The controller may include the touch coordinate calculator 180. When a user touches the touch portion 110 with his or her finger, a capacitance of the detection pattern 113 in the contacted portion may be changed. At this time, the touch coordinate calculator 180 may determine any one, or part, of the detection pattern 113 as a touch point based on input information of capacitance.

The coordinate converter 190 may distinguish a case in which a touch signal is input to the first touch portion 111 from a case in which a touch signal is input to the second touch portion 112.

The first connection unit 114 may be provided in a plurality of pins and the second connection unit 155 may be provided in a plurality of pads corresponding to the number of the first connection unit 114. In this case, a connection direction of the first connection unit 114 and the bonding connection unit 115 in a state in which the touch unit 101 is coupled to allow the first touch portion 111 to face the upper side may be opposite to a connection direction of the first connection unit 114 and the bonding connection unit 115 in a state in which the touch unit 101 is coupled to allow the second touch portion 112 to face the upper side.

For example, when the touch unit 101 is coupled to allow the first touch portion 111 to face the upper side, five of the first connection units 114*a*, 114*b*, 114*c*, 114*d* and 114*e* may be orderly connected to five of second connection units 155*a*, 155*b*, 155*c*, 155*d*, and 155*e*, respectively. In contrast, when the touch unit 101 is coupled to allow the second touch portion 112 to face the upper side, five of the first connection units 114a, 114b, 114c, 114d and 114e may be orderly connected to five of second connection units 155e, 155d, 155c, 155b, and 155a, respectively.

The coordinate converter 190 may determine whether the first touch portion 111 is disposed to face the upper side or the second touch portion 112 is disposed to face the upper side, and when the touch unit 101 is coupled to allow the second touch portion 112 to face the upper side, the coordinate converter 190 may change an order of a signal, which is input to the second connection unit 155, into an opposite of the prior signal. Therefore, the coordinate converter 190 may precisely calculate a touch point regardless of the fact that the first or second touch portion 111 and 112 is disposed to face the upper side.

Figure 16:
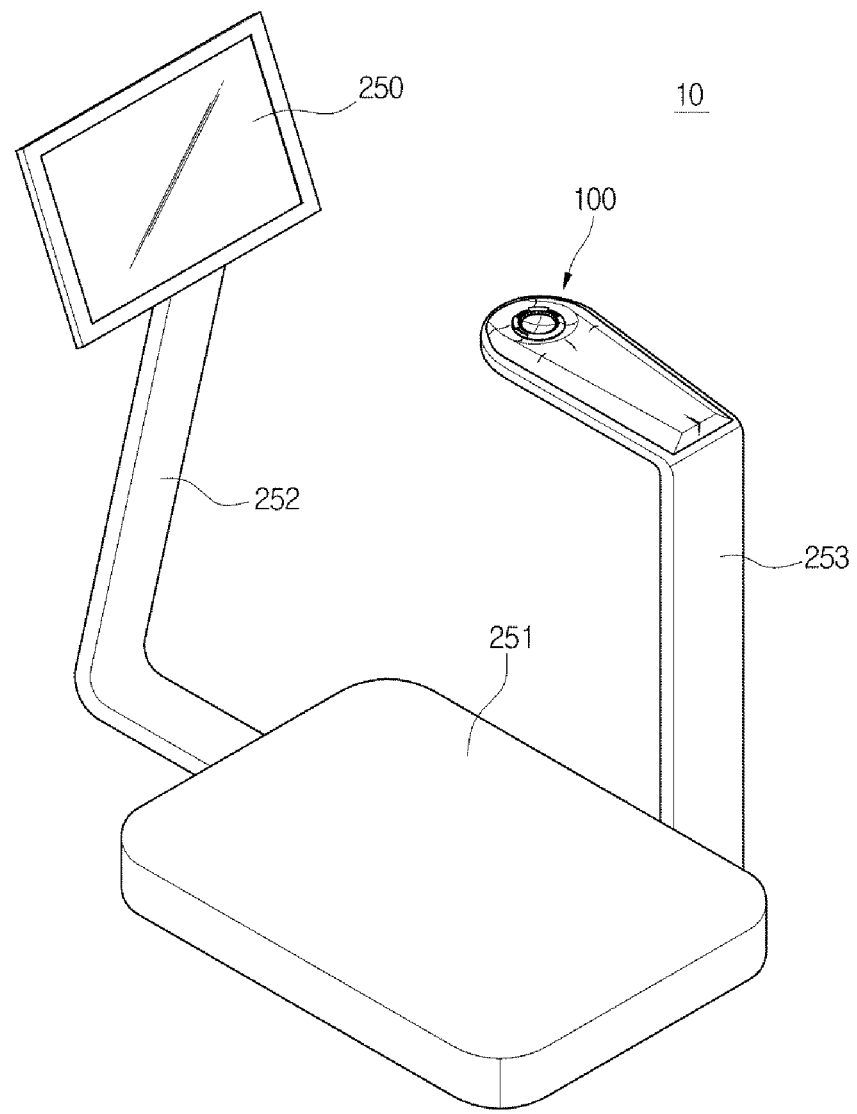
FIG. 16 is a perspective view illustrating a touch input device in accordance with an embodiment of the present disclosure, installed in health care equipment.

FIG. 16 is a perspective view illustrating a touch input device 100 in accordance with an embodiment of the present disclosure, installed in health care equipment 10.

According to an embodiment, the touch input device 100 may be installed in health care equipment 10. The health care equipment 10 may include a medical apparatus. The health care equipment 10 may include a body 251 on which a user stands, a display unit 250, a first connection unit 252 configured to connect the body 251 to the display unit 250, a touch input device 100, and a second connection unit 253 configured to connect the touch input device 100 to the body 251.

The body 251 may measure a variety of a user's physical information including, weight. The display unit 250 may display a variety of image information including measured physical information. In addition, the user may operate the touch input device 100 while looking at the display unit 250.

According to an embodiment, the touch input device 100 may be installed in a vehicle 20.

The vehicle 20 may represent a variety of apparatuses configured to transport an object, such as people, goods or animals, from the departure point to the destination. The vehicle 20 may include a car driving on a road or a track, a ship moving on seas or rivers, and an airplane flying in the sky.

Further, a vehicle driving on a road or track may be moved in a predetermined direction according to the rotation of the at least one wheel, and the vehicle may include a three-wheeled or four-wheeled vehicle, construction equipment, a two-wheeled vehicle, a motorcycle, a cycle and a train traveling on the line.

Figure 17:
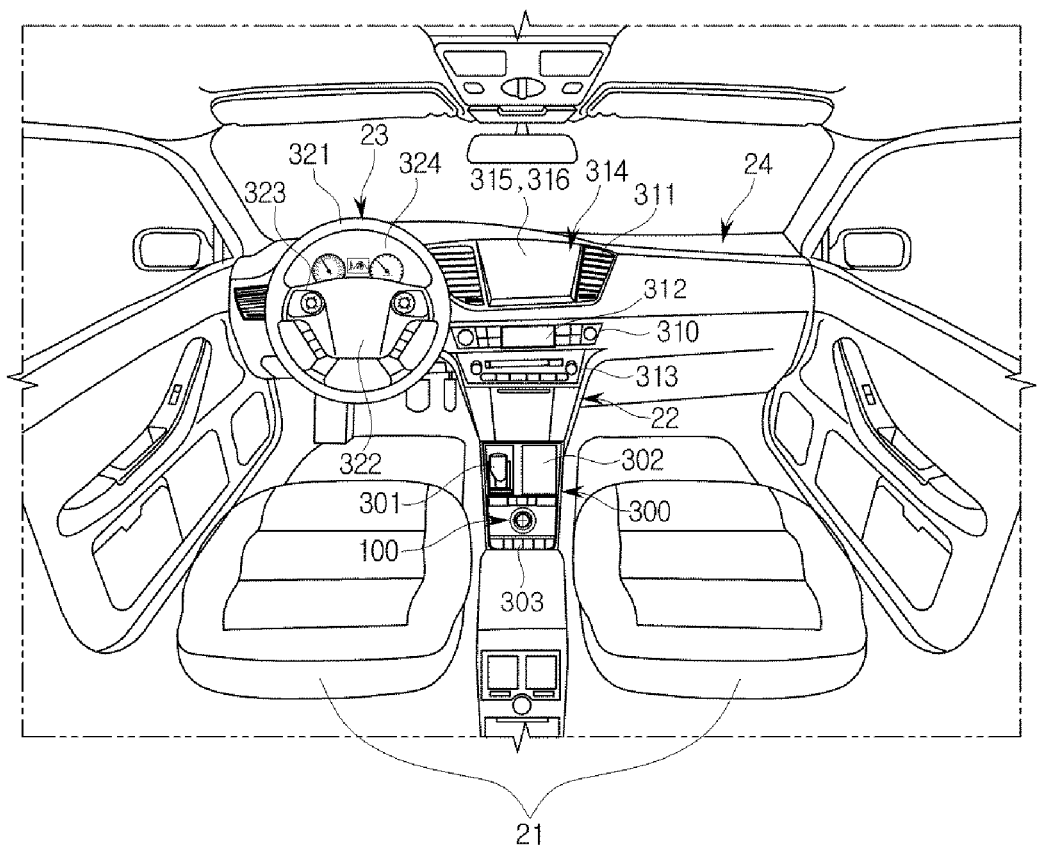
FIG. 17 is a view illustrating an interior of a vehicle, in which a touch input device in accordance with an embodiment of the present disclosure is installed.
Figure 18:
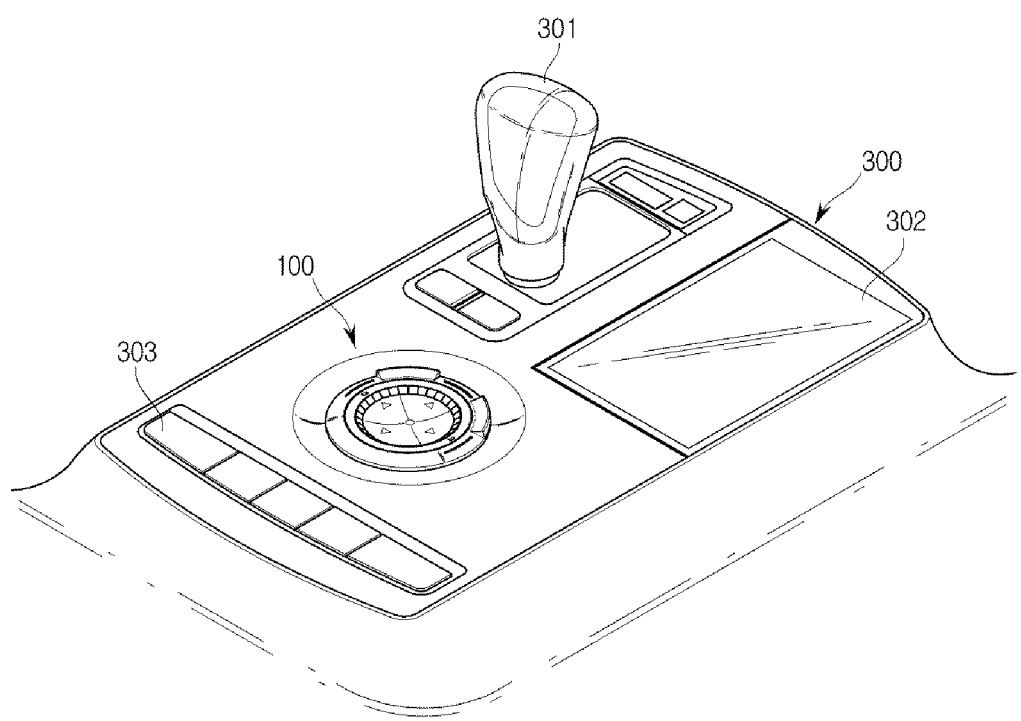
FIG. 18 is a perspective view illustrating a gearbox in which a touch input device in accordance with an embodiment of the present disclosure is installed.

FIG. 17 is a view illustrating an interior of a vehicle, in which a touch input device 100 in accordance with an embodiment is installed and FIG. 18 is a perspective view illustrating a gearbox 300 in which a touch input device 100 in accordance with an embodiment is installed.

Referring to FIG. 17, the vehicle 20 may include a seat 21 on which a passenger is seated and a dashboard 24 provided with a gear box 300, a center fascia 22 and a steering wheel 23.

An air conditioning device 310, a clock 312, an audio device 313 and an AVN device 314 may be installed in the center fascia 22.

The air conditioning device 310 may keep an air inside the vehicle 20 fresh by controlling a temperature, a humidity, an air cleanliness and a flow of air of the inside of the vehicle 20. The air conditioning device 310 may include at least one discharging port 311 provided in the center fascia 22 and configured to discharge air.

A button or a dial may be installed in the center fascia 22 to control the air conditioning device 310. A user, such as a driver, may control the air conditioning device 310 by using a button, or other control, disposed on the center fascia 22.

The clock 312 may be provided adjacent to a button or a dial, which may be configured to control the air conditioning device 310.

The audio device 313 may include an operation panel in which a number of buttons are provided to perform functions of the audio device 313. The audio device 313 may provide a radio mode configured to provide a radio function, and a media mode configured to play an audio file of various storage media in which the audio file is stored.

The AVN device 314 may be embedded inside the center fascia 22 of the vehicle 20 or may be protruded on the dashboard 24. The AVN device 314 may be a device configured to integrally operate an audio function, a video function, and a navigation function according to an operation by a user. The AVN device 314 may include an input unit 315 configured to receive an input of a command about the AVN device 314 from a user, and a display unit 316 configured to display a screen related to an audio function, a screen related to a video function, and a screen related to a navigation function. However, the audio device 313 may be omitted as far as the function of the AVN device 314 is overlapped with a function of the audio device 313.

The steering wheel 23 may be a device configured to adjust a driving direction of the vehicle 20, and may include a rim 321 held by the driver and a spoke 322 connected to a steering system of the vehicle 20 and configured to connect the rim 321 to a hub of a rotation shaft for steering. According to embodiments, a manipulation device 323 may be formed in the spoke 322 to control various devices, such as an audio device, inside the vehicle 20.

The dashboard 24 may further include various gauge boards 324 for informing a variety of information, e.g., driving speed, mileage, engine speed, lubrication quantity, cooling water temperature and a variety of warnings, to a driver during driving of the vehicle, and a globe box 325 in which various things may be stored.

The gear box 300 may be typically installed between a driver seat and a passenger seat in the vehicle 20, and operation devices needed to be operated while a driver drives the vehicle 20 may be mounted to the gear box 300.

Referring to FIG. 18, in the gear box 300, a gear lever 301 configured to change a speed of the vehicle 20, a display unit 302 configured to control performing functions of the vehicle 20, and a button 303 configured to operate a variety of devices of the vehicle 20 may be installed. The touch input device 100 according to an embodiment may be installed in the gear box 300.

According to an embodiment, the touch input device 100 may be installed in the gear box 300 to allow a driver to operate the touch input device 100 while a driver looks forward during driving. For example the touch input device 100 may be installed on a lower portion of the gear lever 301. Alternatively, the touch input device 100 may be installed in the center fascia 22, a passenger seat, or a rear seat.

The touch input device 100 may be connected to the display devices inside the vehicle 20 to allow a user to select or operate a variety icons displayed on the display devices. The display device installed in the vehicle 20 may be the audio device 313, the AVN device 314 or the gauge boards 324. As needed, the display unit 302 may be installed in the gear box 300. In addition, the display device may be connected to Heads Up Display (HUD) device or a back mirror.

For example, the touch input device 100 may move a cursor displayed on the display device or operate an icon. The icon may include, or be included in, a main menu, a selection menu and a setting menu. In addition, through the touch input device 100, a navigation may be operated, an operation condition of the vehicle may be set, and peripheral devices of the vehicle may be operated.

As is apparent from the above description, according to the proposed touch input device, a touch unit may be provided to exchange a first touch portion with a second touch portion and vice versa, which have different shapes, to satisfy a user's various preferences.

By providing the first touch portion and the second touch portion on both surfaces, the shape of a touch surface may vary by changing a direction of a single touch unit.

The coupling of the touch unit may be performed through a screw technology and thus the separation and the coupling may be easily performed and a waste of the space may be minimized.

A change in the pin mapping of the signal transmitter, which may occur when turning over the touch unit, may be released through a coordinated conversion.

The first touch portion may include a concave shape (i.e. recess or dent), so that a sense of operation and a sense of touch may be improved when a user inputs a gesture. In addition, the shape of the touch input unit may be designed in an ergonomic manner so that stress may be not applied to a wrist and a joint in the back of user's hand with the long time work.

The touch input unit may be formed to be lower than the surroundings thereof, and thus a user may intuitively recognize the touch area without looking at the touch input unit so that a recognition rate of the gesture may be improved.

The touch input unit may include a concave curved surface so that a user may intuitively recognize that a finger is placed in an area of the touch input unit through a sense of an gradient that is felt by the user's finger, in a state in which the user uses the touch input device without looking at the touch input unit when the user looks at the display or watches forward.

Therefore, the user may easily input a gesture while looking at the display unit without looking at the touch input unit to input a gesture, and the user may input a precise gesture to a correct position so that a recognition rate of the gesture may be improved.

In a state in which the touch input device according to an embodiment is applied to a vehicle, a user may input a precise gesture while watching the front direction, when the user operates a navigation or an audio device while driving.

By providing a swiping input unit in the surroundings of the gesture input unit, a dial function that is physically rotated may be replaced. In addition, the swiping input unit may recognize a variety of touch gestures so as to perform functions that are more various and improved than the dial function.

By displaying a graduation that is felt by a sense of touch, a user may intuitively recognize a swiping angle (or a distance). Therefore, it may be possible to input a various signals according to the swiping angle (or a distance) and thus a degree of freedom of operation may be improved and the input accuracy may be improved.

A gradient of the gesture input unit and the swiping input unit may be different from each other, and thus a user may intuitively distinguish the gesture input unit from the swiping input unit by only a touch.

The second touch portion may include a convex shape and thus it may satisfy a user having a preference in the touch portion having a convex shape over a concave shape, according to a length of user's nail, a length of user's finger or a user's preference.

Although embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A touch input device comprising:
   a mounting unit in which a mounting groove is formed at an inner side of the mounting unit; and
   a touch unit accommodated in the mounting groove and installed to be detachable from the mounting unit,
   wherein the touch unit comprises a first touch portion and a second touch portion, which are provided on both surfaces of the touch unit and allow a user to input a touch gesture, and the touch unit is selectively coupled to the mounting unit to allow the first touch portion to face an upper side or to allow the second touch portion to face the upper side, wherein the touch unit further comprises a detection pattern provided between the first touch portion and the second touch portion, wherein the detection pattern detects both of a touch signal input to the first touch portion and a touch signal input to the second touch portion, and
   the first touch portion comprises a concave curved shape and the second touch portion comprises a convex curved shape corresponding to the concave curved shape of the first touch portion,
   and a first screw unit provided in an outer surface of the touch unit and a second screw unit provided in an inner surface of the mounting groove are screw-coupled together,
   wherein the first screw unit or the second screw unit is provided with a locking unit so that the coupling of the first screw unit and the second screw unit is completed in the same position as when the touch unit is coupled to the mounting unit.

2. The touch input device of claim 1, wherein a distance from the first touch portion to the detection pattern is the same as a distance from the second touch portion to the detection pattern.

3. The touch input device of claim 1, wherein the first touch portion comprises a first gesture unit provided in a concave curved surface shape and a first wheel unit inclined downward from the center while along a circumference of the first gesture unit, and the second touch portion comprises a second gesture unit provided in a convex curved surface shape and a second wheel unit inclined upward from the center while along a circumference of the second gesture unit.

4. The touch input device of claim 1, wherein the first touch portion or the second touch portion comprises a concave shape, wherein the concave shape is gradually deepened from an edge unit toward the center or the concave shape maintains the same depth.

5. The touch input device of claim 3, wherein the first gesture unit and the first wheel unit, and the second gesture unit and the second wheel unit receive inputs of an independent touch signal, respectively.

6. The touch input device of claim 3, wherein a gradient of the first wheel unit is larger than a tangential gradient of the first gesture unit adjacent the first wheel unit, and a gradient of the second wheel unit is larger than a tangential gradient of the second gesture unit adjacent the second wheel unit.

7. The touch input device of claim 1, wherein the mounting unit further comprises a button input tool provided in the surroundings of the mounting groove for performing a determined function.

8. The touch input device of claim 7, wherein the button input tool comprises a touch button for performing a function determined by a user's touch and a press button for performing a determined function while changing a position by an external force applied by a user.

9. A vehicle comprising:
a touch input device comprising:
a mounting unit in which a mounting groove is formed at an inner side of the mounting unit; and
a touch unit accommodated in the mounting groove and installed to be detachable from the mounting unit,
wherein the touch unit comprises a first touch portion and a second touch portion, which are provided on both surfaces of the touch unit and allow a user to input a touch gesture, and the touch unit is selectively coupled to the mounting unit to allow the first touch portion to face an upper side or to allow the second touch portion to face the upper side;
a display device; and
a controller for operating the display device according to an input signal that is input to the touch input device, wherein the touch unit further comprises a detection pattern provided between the first touch portion and the second touch portion, wherein the detection pattern detects both of a touch signal input to the first touch portion and a touch signal input to the second touch portion, and the first touch portion comprises a concave curved shape and the second touch portion comprises a convex curved shape corresponding to the concave curved shape of the first touch portion and a first screw unit provided in an outer surface of the touch unit and a second screw unit provided in an inner surface of the mounting groove are screw-coupled together,
wherein the first screw unit or the second screw unit is provided with a locking unit so that the coupling of the first screw unit and the second screw unit is completed in the same position as when the touch unit is coupled to the mounting unit.

10. The vehicle of claim 9, wherein the touch input device is installed in a gear box.

* * * * *